. United States Patent [19]

Colon et al.

[11] Patent Number: 4,647,506

[45] Date of Patent: Mar. 3, 1987

[54] FLEXIBLE, SELF-CROSS-LINKING BINDERS

[75] Inventors: Ismael Colon, Piscataway; Robert Johnson, Basking Ridge, both of N.J.

[73] Assignee: Union Carbide Corporation, Danbury, Conn.

[21] Appl. No.: 779,838

[22] Filed: Sep. 25, 1985

Related U.S. Application Data

[63] Continuation-in-part of Ser. No. 639,008, Aug. 8, 1984, abandoned.

[30] Foreign Application Priority Data

Aug. 8, 1985 [EP] European Pat. Off. ........ 85109987.9

[51] Int. Cl.$^4$ ................................................ G11B 5/70
[52] U.S. Cl. .................................. 428/413; 252/62.54;
360/134; 360/135; 360/136; 427/44; 427/128;
428/423.1; 428/522; 428/694; 428/900;
428/425.9; 528/75; 528/69; 523/181
[58] Field of Search .................... 428/694, 900, 423.1,
428/425.9, 413, 522, 1; 528/75, 69; 523/181;
427/44, 128; 252/62.54; 360/134–136

[56] References Cited

U.S. PATENT DOCUMENTS

| 4,004,997 | 1/1977 | Tsukamoto | 428/900 |
|---|---|---|---|
| 4,082,710 | 4/1978 | Vrancken | 427/54 |
| 4,139,436 | 2/1979 | Jasani | 528/75 |
| 4,205,018 | 5/1980 | Nagasawa | 427/44 |
| 4,233,425 | 11/1980 | Tefertiller | 427/44 |
| 4,317,894 | 3/1982 | Lewarchik | 525/455 |
| 4,323,621 | 4/1982 | Kober | 428/69 |
| 4,358,477 | 11/1982 | Noomen | 528/75 |
| 4,381,334 | 4/1983 | Balk | 428/407 |
| 4,408,020 | 10/1983 | Kolycheck | 528/75 |
| 4,415,630 | 11/1983 | Kubota | 427/44 |
| 4,503,198 | 3/1985 | Miyai | 523/181 |
| 4,511,629 | 4/1985 | Konno | 428/900 |

FOREIGN PATENT DOCUMENTS

| 0189829 | 4/1982 | Japan . |
| 2065126 | 6/1981 | United Kingdom . |
| 2085906 | 5/1982 | United Kingdom . |

OTHER PUBLICATIONS

CA, 94: 175973u, 1981.

Primary Examiner—Ellis P. Robinson
Attorney, Agent, or Firm—J. B. Mauro

[57] ABSTRACT

Flexible, self-cross-linking binders, useful for, e.g., paints and magnetic media composites, are prepared from hydroxyl-containing thermoplastic polymers reacted with condensates of diisocyanates and unsaturated esters. They can be cured with an electron beam.

37 Claims, No Drawings

FLEXIBLE, SELF-CROSS-LINKING BINDERS

This application is a continuation-in-part of Ser. No. 639,008, filed Aug. 08, 1984, now abandoned.

BACKGROUND OF THE INVENTION

This invention pertains to flexible, self-cross-linking binders and more particularly to their use in magnetic media and other heavily pigmented compositions.

BACKGROUND ART

Magnetic recording media may take the form of magnetic cards and disks, reels, video tapes, computer tapes, etc. Magnetic tape, for example, consists of a very uniform magnetic coating which is bonded to a plastic support film. Magnetic tape is utilized for audio, video, computer, instrumentation, or other recordings.

The basic components of a magnetic tape are the plastic support film and the magnetic coating. The magnetic coating contains magnetizable particles which store the information and a resinous binder which provides the cohesive matrix between the magnetic particles and adheres them to the support film. The preferred polymer for the support film is biaxially oriented polyethylene terephthalate (PET), due to its excellent dimensional stability, high tensile strength, toughness, pliability and resistance to attack by mildew and fungus. However, other polymers such as polyvinylchloride and polypropylene have been used. Gamma ferric oxide is the most widely used magnetic particle.

Binder systems for magnetic tape coatings are based on blends of hard and plasticizing or toughening resins. The combination of a rigid polymer and an elastomeric polymer offers performance advantages which cannot be obtained with a single component or other simple resin system.

Most conventional binders contain a blend of a hydroxylated copolymer resin, and an elastomeric modifier. The copolymer is usually modified with from 30% to 60% by weight of a plasticizing or toughening resin to increase its abrasion resistance. The amount of modifier used in a formulation is a function of the performance requirements of the particular application. The modifying resin may be a nitrile rubber, a polyester, an alkyd or a polyester urethane. The latter resin is preferred for high performance applications. The polyester urethanes are the reaction products of polyester polyols, short chain diols, and isocyanates. These resins have excellent toughness and abrasion resistance.

Blends of the hydroxylated copolymer resins and polyester urethane resin are cross-linked with polyfunctional isocyanates to further increase their toughness and abrasion resistance. Cross-linking of the resins occurs over a period of time including while the tapes are in storage. If the crosslinking takes place prior to calendering, the tape does not polish properly.

For the highest performance applications, such as computer tapes, phenoxy resins are preferred as the hydroxyl-containing polymer because of their superior durability, toughness, and thermal stability. The phenoxy resin can be modified with the same polyester urethane plasticizing resins and isocyanate prepolymer cross-linkers or polyfunctional isocyanates.

Curing of polyurethane-based coatings in combination with hydroxyl-containing polymers is accomplished with the addition of various multifunctional isocyanates. Once the isocyanate is mixed with the coating formulation, the cross-linking reaction begins immediately, giving the coating a limited pot life on the coater or during the coating/calendering processes. Another disadvantage is the extreme reactivity of the isocyanate molecule with water. A trace of water in the solvent, or moisture absorbed on the magnetic particle, or even moisture in the plant environment, will quickly react with the isocyanate negating its ability to crosslink the polyurethane. The resulting film will fall far short of the desired toughness and flexibility.

Controlling the many sources of moisture is difficult, so nonuniform batch-to-batch cures are unavoidable. In an effort to overcome this problem, the coated and calendered tape is often stored for two or more weeks; sometimes at elevated temperature under dry conditions to assure a complete cure. Despite this, it is not uncommon to reject substantial quantities of uncured tape after postcure.

Attempts have been made to formulate binder systems which could be cured by electron beam radiation. Electron curing has been shown to provide a thorough, consistent cure, not possible with the polyurethane/hydroxylated polymer/isocyanate systems.

Experimenters have found they could formulate electron beam-curable coatings with resin systems consisting of simple blends of electron-curable, multifunctional acrylates and methacrylates derived from simple diols, triols and tetraols not containing repeating polyester units. These multifunctional acrylate and methacrylates include trimethylolpropane triacrylate, tripropylene glycol diacrylate, pentaerythritol triacrylate, pentaerythritol tetraacrylate, ethylene glycol dimethacrylate, triethyl glycol dimethacrylate, trimethylolpropane dimethacrylate, and the like. These blends showed good binding of the magnetic particles, adequate adhesion to polyester film and elimination of blocking (impeded unwinding of reeled tape caused by sticking of the coating to the next winding). However, the mechanical properties of the tapes were poor due to the use of multifunctional acrylates such as trimethylolpropane triacrylate and pentaerythritol triacrylate, which embrittled the film. Also, the surface wear resistance of the resulting tapes was variable. Further, these acrylates were volatilized during the solvent drying step when solvents such as cyclohexanone, tetrahydrofuran, etc., were removed. The result was that systems employing these acrylates did not meet the standards of the magnetic media industry.

In U.S. Pat. No. 4,059,715 there is described, as a binder, a thermoplastic copolyester consisting of 5 to 75 percent by weight of amorphous ester units and 95 to 25 percent by weight of crystallizable ester units joined through the ester linkages. U.K. Patent application GB 2085906, published May 6, 1982, describes a particular thermosetting resin as a binder, which is stated to be preferred because of its favorable effects upon the physical properties such as resistance to wear, heat and solvents of the final magnetic recording medium. In the U.K. Patent Application, the magnetic recording medium is made by using: (A) a compound having two or more radiation-curable, unsaturated double bonds and a molecular weight of not less than 5000, (B) a compound having one or more radiation-curable, unsaturated double bonds and a molecular weight of over 400 and less than 5000, and (C) a compound having one or more radiation-curable, unsaturated double bonds and a molecular weight of less than 400. The substrate is then coated with a magnetic material, stated in the U.K.

Patent Application to be composed essentially of a binder which is a mixture of the compounds (A) and (B), or of (A), (B), and (C), magnetic particles, and a solvent. The coating is stated to be predryed and then the coated matter is irradiated with electromagnetic rays. The compound (A) is one prepared by reacting either a partly saponified vinyl chloride-vinyl acetate copolymer or a vinyl chloride-vinyl alcohol copolymer, obtained by saponifying almost all of the acetyl groups of the vinyl chloride-vinyl acetate copolymer, with a polyisocyanate compound, and then reacting the resulting isocyanate-containing compound with an acrylic or methacrylic compound having a functional group reactive with the isocyanate group. The compound (B) is one prepared by reacting a polyol with a polyisocyanate compound and then reacting the resulting isocyanate-containing compound with an acrylic or methacrylic compound having a functional group reactive with the isocyanate group. The compound (C) is described (on page 4) of the U.K. Patent Application as selected from styrene, ethyl acrylate, ethylene glycol diacrylate, ethylene glycol dimethacrylate, diethylene glycol diacrylate, diethylene glycol dimethacrylate, 1,5-hexane glycol diacrylate, 1,6-hexane glycol dimethacrylate, trimethylolpropane triacrylate, and trimethylolpropane trimethacrylate.

The U.K. Patent Application states that the above-mentioned compounds (A), (B), and (C), when adopted singly, will provide radiation curable coatings but will not always give a magnetic coating material of good physical properties. It is only by mixing the compounds (A), (B), and (C) of different molecular weights that curability is stated to be attained even with a low dosage of about 1-3 mrads, and many different physical property requirements can be met. Especially, the binders consisting of the (A)-(B) and (A)-(B)-(C) combinations are stated to be superior to the binder of the (A)-(C) combination in bonding ability, flexibility, etc.

Thus, there is a need to develop one-component binder systems which are suitable for electron beam curing, which require fewer components than those above, and which can improve the wear characteristics of the magnetic coating.

It is an object of this invention to provide binders which impart greater toughness to magnetic media and other highly pigmented formulations.

It is another object of this invention to provide binders which enhance the flexibility of magnetic media and other highly pigmented formulations containing them.

It is still another object of this invention to provide binders which when added as part of the magnetic media formulations produce products which exhibit abrasion resistance and overall durability. It is another object to provide binders which can be cured by an electron beam.

Other objects will become apparent to those skilled in the art upon a further reading of the specifications.

STATEMENT OF THE INVENTION

It has now been discovered that a magnetic recording medium satisfying the objects enumerated supra can be formulated from a magnetic recording medium composite comprising a base substrate with a stratum of magnetic recording medium deposited and adhering thereon, said magnetic recording medium in turn comprising a cured binder and magnetic particles wherein the binder comprises a normally solid, pendant hydroxyl-containing thermoplastic polymer having at least 8 hydroxyl groups per molecule chain whose hydroxyl groups have been partly reacted by a grafting reaction with a condensation product of a diisocyanate and an unsaturated ester, said condensation product having the graphic formula:

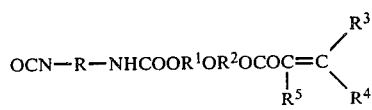

wherein
R is a divalent aromatic, saturated aliphatic or alicyclic group;
$R^1$ is a divalent residue of a saturated aliphatic polyester or polyether, having a number average molecular weight of at least about 100, left after the interaction of an isocyanate group with a terminal hydroxyl group on said polyester or polyether;
$R^2$ is an alkylene group, having 1 to about 10 carbon atoms; and
$R^3$, $R^4$ and $R^5$ are each hydrogen or alkyl groups having from 1 to about 15 carbon atoms and can be the same or different.

Optionally, either or both of the grafting reaction and the condensation reaction can be catalyzed. The choice of catalyst(s) is not considered to be particularly critical, and various useful catalysts are known to the art. When used, the catalyst concentration should be in the normally effective range, preferably about 0.001 to about 0.1% by weight. It is possible, and sometimes desirable, to use a combination or mixture of catalysts comprising, e.g., a tin catalyst and an amine catalyst, such as triethylene diamine (DABCO). Such a combination is preferred when the intermediate (i.e., the condensation product) is to be reacted with a carboxyl-containing hydroxyl-containing resin.

The normally solid, pendant hydroxyl-containing thermoplastic polymers can be thermoplastic polyhydroxyethers, hydrolyzed vinyl chloride/vinyl acetate copolymers, ethylene/vinyl alcohol copolymers, hydroxyl-carrying polyesters, polyethers, polyurethanes, acrylic acid copolymers, and the like, all carrying at least, and preferably more than, 8 hydroxyl groups per molecule.

The term "thermoplastic polyhydroxyether" herein refers to substantially linear polymers having the general formula:

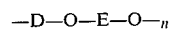

wherein D is the radical residuum of a dihydric phenol, E is an hydroxyl-containing radical residuum of an epoxide, and n represents the degree of polymerization and is at least about 30 and is preferably about 80 or more. The term "thermoplastic polyhydroxyether" is intended to include mixtures of two or more thermoplastic polyhydroxyethers.

The thermoplastic poly(hydroxyethers) can be prepared by admixing from about 0.985 to about 1.015 moles of an epihalohydrin with one mole of a dihydric phenol together with from about 0.6 to 1.5 moles of an alkali metal hydroxide, such as sodium hydroxide or potassium hydroxide, generally in an aqueous medium at a temperature of about 10° to about 50° C., until at least about 60 mole percent of the epihalohydrin has been consumed. The thermoplastic poly(hydroxyethers) thus produced have reduced viscosities of at least 0.43. Reduced viscosity values were computed by use of the equation:

$$\text{Reduced Viscosity} = \frac{t_s - t_o}{ct_o}$$

wherein $t_o$ is the efflux time of the solvent (tetrahydrofuran), $t_s$ is the efflux time of the poly(hydroxyether) solution, and c is the concentration of the poly(hydroxyether) solution in terms of grams of poly(hydroxyether) per 100 ml of tetrahydrofuran.

The dihydric phenol contributing the phenol radical residuum, D can be mononuclear or polynuclear. When D is a dihydric polynuclear phenol it may be represented by the general formula:

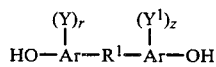

wherein Ar is an aromatic divalent hydrocarbon such as naphthylene and, preferably, phenylene, Y and $Y^1$, which can be the same or different, are alkyl radicals, preferably having from 1 to 4 carbon atoms, halogen atoms, i.e., fluorine, chlorine, bromine and iodine, or alkoxy radicals, preferably having from 1 to 4 carbon atoms, r and z are integers having a value from 0 to a maximum value corresponding to the number of hydrogen atoms on the aromatic radical (Ar) which can be replaced by substituents, and $R^1$ is a bond between adjacent carbon atoms as in dihydroxydiphenyl or is a divalent radical including, for example,

—O—, —S—, —SO—, —SO$_2$— and —S—S—, and divalent hydrocarbon radicals such as alkylene, alkylidene, cycloaliphatic, e.g., cycloalkylidene, halogenated alkoxy or aryloxy substituted alkylene, alkylidene and cycloaliphatic radicals as well as alkarylene and aromatic radicals, including halogenated, alkyl, alkoxy or aryloxy substituted aromatic radicals and a ring fused to an Ar group; or $R^1$ can be polyalkoxy, or polysiloxy, or $R^1$ can be polyalkoxy, or polysiloxy, or two or more alkylidene radicals separated by an aromatic ring, a tertiary amino group, and either linkage, a carbonyl group or a sulfur-containing group such as sulfoxide, and the like.

Examples of specific dihydric polynuclear phenols include among others:

The bis(hydroxyphenyl)alkanes such as
2,2-bis(4-hydroxyphenyl)propane,
2,4'dihydroxydiphenylmethane,
bis(2-hydroxyphenyl)methane,
bis(4-hydroxyphenyl)methane,
bis(4-hydroxy-2,6-dimethyl-3-methoxyphenyl)methane,
1,1-bis(4-hydroxyphenyl)ethane,
1,2-bis(4-hydroxyphenyl)ethane,
1,1-bis(4-hydroxy-2-chlorophenyl)ethane,
1,1-bis(3-methyl-4-hydroxyphenyl)ethane,
1,3-bis(3-methyl-4-hydroxyphenyl)propane,
2,2-bis(3-phenyl-4-hydroxyphenyl)propane,
2,2-bis(3-isopropyl-4-hydroxyphenyl)propane,
2,2-bis(2-isopropyl-4-hydroxyphenyl)propane,
2,2-bis(4-hydroxylnaphthyl)propane,
2,2-bis(4-hydroxyphenyl)pentane,
3,3-bis(4-hydroxyphenyl)pentane,
2,2-bis(4-hydroxyphenyl)heptane,
bis(4-hydroxyphenyl)phenylmethane,
bis(4-hydroxyphenyl)cyclohexylmethane,
1,2-bis(4-hydroxyphenyl-1,1-bis(phenyl)propane,
2,2-bis(4-hydroxyphenyl)-1-phenyl-propane and the like;

Di(hydroxyphenyl)sulfones such as bis(4-hydroxyphenyl)sulfone, 2,4'-dihydroxydiphenyl sulfone, 5'-chloro-2,4'-dihydroxydiphenyl sulfone, 5'-chloro-4,4'-dihydroxydiphenyl sulfone and the like;

Di(hydroxyphenyl)ethers such as
bis(4-hydroxyphenyl)ether, the 4,3'-, 4,2'-, 2,2'-, 2,3'-, dihydroxydiphenyl ethers,
4,4'-dihydroxy-2,2-dimethyldiphenyl ether,
bis(4-hydroxy-3-isobutylphenyl)ether,
bis(4-hydroxy-3-isopropyphenyl)ether,
bis(4-hydroxy-3-chlorophenyl)ether,
bis(4-hydroxy-3-fluorophenyl)ether,
bis(4-hydroxy-3-bromophenyl)ether,
bis(4-hydroxynaphthyl)ether,
bis(4-hydroxy-3-chloronaphthyl)ether,
bis(2-hydroxydiphenyl)ether,
4,4'dihydroxy-2,6-dimethoxydiphenyl ether,
4,4'-dihydroxy-2,5-diethoxydiphenyl ether, and the like.

Also suitable are the bisphenol reaction products of 4-vinylcyclohexene and phenols, e.g., 1,3-bis(p-hydroxyphenyl)-1-ethylcyclohexane and the bis-phenol reaction products of dipentene or its isomers and phenols such as 1,2-bis(p-hydroxyphenyl)-1-methyl-4-isopropylcyclohexane as well as bisphenols such as 1,3,3-trimethyl-1-(4-hydroxyphenyl)-6-hydroxyindane, and 2,4-bis(4-hydroxyphenyl)-4-methylpentane, and the like.

Particularly desirable dihydric polynuclear phenols have the formula

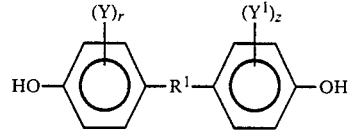

wherein Y and $Y^1$ are as previously defined, r and z have values from 0 to 4 inclusive and $R^1$ is a divalent saturated aliphatic hydrocarbon radical, particularly alkylene and alkylidene radicals having from 1 to 3 carbon atoms, and cycloalkylene radicals having up to and including about 10 carbon atoms.

Mixtures of dihydric phenols can also be employed and whenever the term "dihydric phenol" or "dihydric polynuclear phenol" is used herein, mixtures of these compounds are intended to be included.

The epoxide contributing the hydroxyl-containing radical residuum, E, can be monoepoxide or diepoxide. By "epoxide" is meant a compound containing an oxirane group, i.e., oxygen bonded to two vicinal aliphatic carbon atoms, thus,

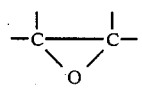

a monoepoxide contains one such oxirane group and provides a radical residuum E containing a single hydroxyl group, a diepoxide contains two such oxirane groups and provides a radical residuum E containing two hydroxyl groups. Saturated epoxides, by which term is meant diepoxides free of ethylenic unsaturation, i.e., >C=C<, and acetylenic unsaturation, i.e., —C≡C—, are preferred. Particularly preferred are halogen-substituted saturated monoepoxides, i.e., the epihalohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen —O—, oxycarbonyl oxygen

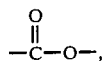

carbonyl oxygen

and the like.

Specific examples of monoepoxides include epihalohydrins such as epichlorohydrin, epibromohydrin, 1,2-epoxy-1-methyl-3-chloropropane, 1,2-epoxy-1-butyl-3-chloropropane, 1,2-epoxy-2-methyl-3-fluoropropane, and the like.

Illustrative diepoxides include diethylene glycol bis(3,4-epoxycyclohexane-carboxylate), bis(3,4-epoxycyclohexyl-methyl)adipate, bis(3,4-epoxycyclohexylmethyl)phthalate, 6-methyl-3-4-epoxycyclohexylmethyl-6-methyl-3,4-epoxycyclohexane carboxylate, 2-chloro-3,4-epoxycyclohexylmethyl-2-chloro-3,4-epoxycyclohexane carboxylate, diglycidyl ether of bisphenol-A, bis(2,3-epoxycyclopentyl)ether, 1,5-pentanediol bis(2,3-epoxy-2-ethylhexyl)adipate, diglycidyl maleate, diglycidyl phthalate, 3-oxatetracyclo[4.4.0.1$^{7,10}$.0$^{2,4}$]-undec-8-yl 2,3-epoxypropyl ether, bis(3,4-epoxyhexoxypropyl)sulfone, 2,2'-sulfonyldiethyl-bis(2,3-epoxycyclopentane carboxylate), 3-oxytetracyclo-[4.4.0.1$^{7,10}$.0$^{2,4}$]-undec-8-yl 2,3-epoxybutyrate, bis(2,3-epoxybutylphenyl)-2-ethylhexyl phosphate, diepoxydioxane, butadiene dioxide, and 2,3-dimethyl butadiene dioxide. The preferred diepoxides are those wherein each of the oxirane groups is connected to an electron-donating substituent which is not immediately connected to the carbon atoms of that oxirane group. Such diepoxides having the grouping

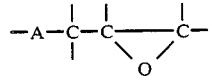

wherein A is an electron-donating substituent such as

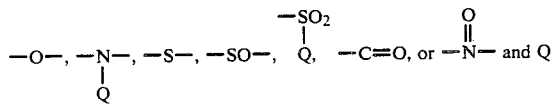

is a saturated hydrocarbon radical such an an alkyl, cycloalkyl, aryl or aralkyl radical.

Thermoplastic polyhydroxy ethers are available commercially from Union Carbide Corporation as UCAR ® phenoxy resins.

Illustrative hydrolyzed vinyl chloride/acetate copolymers include vinyl chloride/vinyl acetate/vinyl alcohol terpolymers, and the like. These are commercially available from Union Carbide Corporation as VAGH, and VAGD UCAR ® Solution Vinyl Resins. In addition to these resins, it is also possible to use hydrolyzed versions of vinyl chloride/vinyl acetate/maleic acid terpolymers, such as VMCA, VMCC, and VMCH UCAR ® Solution Vinyl Resins (available from Union Carbide). The alpha-olefin vinyl alcohol copolymers useful in this invention contain the moieties (a) and (b) delineated in the graphical formulae shown below:

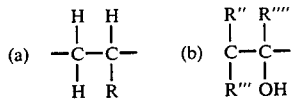

wherein each of R, R', R", R''' R'''' is hydrogen or an alkyl group having 1 to about 8 carbon atoms. The preferred alpha-olefin/vinyl alcohol copolymer is an ethylene/vinyl alcohol copolymer where R', R", R''' and R'''' are each hydrogen in moieties (a) and (b).

The vinyl alcohol content of these copolymers may vary from about 1 to 90 mole %. Preferred copolymers contain about 20 to about 70 mole %, while most preferred alpha-olefin/vinyl copolymers contain about 25 to about 65 mole %. These copolymers can be prepared by the saponification of the corresponding alpha-olefin/vinyl acetate copolymers. The preparation of ethylene/vinyl alcohol copolymers is described in U.S. Pat. No. 3,157,563 at Column 2, line 33 to line 63, which patent is incorporated herein by reference. It should be noted that incompletely saponified products are also useful, i.e., terpolymers containing ethylene, vinyl acetate and vinyl alcohol copolymerized therein. The preferred terpolymers are those having a vinyl alcohol content as specified above. Preferred tetrapolymers with maleic acid or maleic anhydride preferably have a carboxyl content of less than about 2%.

The lactone-acrylate adduct that is suitable for use in this invention is prepared by reacting a lactone with an hydroxyalkyl acrylate. The lactones suitable for use in preparing the lactone-acrylate adduct are characterized by the following formula:

wherein the R's are independently hydrogen or alkyl of from 1 to about 12 carbon atoms, and x is from about 4 to about 7.

The hydroxyalkyl acrylates used in this invention include 2-hydroxyethyl acrylate, hydroxypropyl acrylate, hydroxybutyl acrylate, 2-hydroxy-3-chloro-propyl acrylate, 2,3-dihydroxy propyl acrylate, and the like, or mixtures thereof. Hydroxyethyl acrylate is preferred. Minor amounts of hydroxyalkyl methacrylates may be included.

The lactone-acrylate adduct is prepared by reacting the lactone with the hydroxyalkyl acrylate in the presence of less than about 200 parts per million of a catalyst. The catalyst which may be used includes one or more organometallic compounds and other metallic compounds such as stannic chloride or ferric chloride and other Lewis and protonic acids. Preferred catalysts include stannous octanoate, dibutyltin dilaurate, and other tin compounds; titanates such as tetraisopropyl titanate and butyl titanate; and the like.

The reaction is carried out at a temperature of from about 100° to about 400° C., preferably from about 120° to about 130° C. The reaction may be carried out at atmospheric pressure, although higher or lower pressures may be used. The reaction is generally carried out in the presence of oxygen to inhibit polymerization of the hydroxyalkyl acrylate. The reaction is carried out for a period of from about 2 to about 20, preferably from about 3 to about 11 hours. The reaction is carried out in the presence of a suitable inhibitor to prevent polymerization of the hydroxyalkyl acrylate double bond. These inhibitors include the monomethyl ether of hydroquinone, benzoquinone, phenothiazine, methyl hydroquinone, 2,5-di-t-butylquinone, hydroquinone, benzoquinone, and other common free-radical inhibitors known in the art. The level of inhibitor used is less than 100 parts per million, preferably less than 800 parts per million, and most preferably, less than 600 parts per million.

The lactone-acrylate adduct contains from one to about 10 moles of lactone per mole of hydroxyalkyl acrylate. The lactone has the structure:

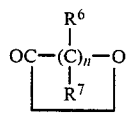

wherein $R^6$ and $R^7$ are each hydrogen or alkyl having from 1 to about 12 carbon atoms and n is an integer having values of from about 4 to about 7. The preferred lactone is epsilon-caprolactone.

Other hydroxyl-containing polyesters include esters of glycols and dibasic acids such as
poly(1,4-butylene adipate),
poly(1,4-butylene acelate),
poly(1,4-butylene suberate),
poly(1,4-butylene sebacate),
poly(1,3-propylene oxalate),
poly(1,2-ethylene malonate), and the like.

Exemplary hydroxyl-containing polyethers include:
poly(ethylene glycol),
poly(1,2-propylene glycol),
poly(2,3-propylene glycol),
poly(1,4-propylene glycol), and the like.

In its preferred form, the preparation of the electron beam-curable binders of this invention is accomplished by reacting a monohydroxy-terminated acrylate ester of epsilon-caprolactone dimer known as TONE-M-100 and having the structural formula:

$HO(CH_2)_5COO(CH_2)_5COOCH_2CH_2OCOCH=CH_2$ with a diisocyanate, such as isophorone diisocyanate, having the structure:

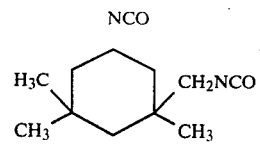

The product obtained has the structure (A):

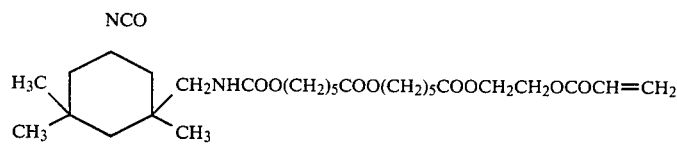

The product A can then be coupled with the poly(hydroxy) compounds, such as thermoplastic polyhydroxyether (PHE), to provide electron beam-curable compositions. While not wishing to be bound to any specific structure, it is postulated that the isocyanate groups, having reacted with random pendant hydroxyl groups, form urethane linkages, as shown in structure (B):

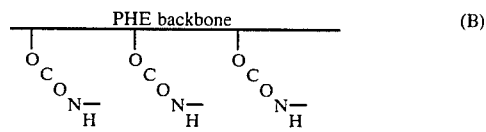

The diisocyanates suitable for use herein are known in the art and include the aliphatic and aromatic diisocyanates. Many such compounds are known to those skilled in the art, and illustrative thereof one can mention 2,4-toluene diisocyanate, 2,6-toluene diisocyanate, isophorone diisocyanate, 4,4'-diphenylmethane diisocyanate, di(2-isocyanatoethyl)-bicyclo (2.2.1) hept-5-ene-2,3-dicarboxylate, 3,5,5-triethyl-1-isocyanato-3-isocyanato-methylcyclohexane, 1,6-hexamethylene diisocyanate, m- and p-xylene diisocyanate, cyclohexane-1,4-diisocyanate, dicyclohexyl-4,4'-methane diisocyanate, tetramethylene diisocyanate, cyclopentylene-1,3-diisocycanate, 1,3-diisocyanate, 1,4-xylene diisocyanate, 1,5-naphthalene diisocyanate, m-phenylene diisocyanate, p-phenylene diisocyanate, hexamethylene diisocyanate, 3,3'-dimethyl-4,4'-diphenyl-methane diisocyanate, 4,4'diphenylmethane diisocyanate, 3,3'-dimethylbiphenylene diisocyanate, 4,4'biphenylene diisocyanate, 3,3'-dimethoxy-4,4'-dimethyl 4,4'-biphenylene diisocyanate, durene diisocyanate, 1-phenoxy-2,4-phenylene diisocyanate, 1-tert-butyl-2,4-phenylene diisocyanate, 2,2,4-trimethylhexamethylene diisocyanate, and the like or mixtures thereof.

The binder compositions of this invention can also be employed in other end use areas, such as highly pigmented compositions, including zinc-rich coatings, paints, and the like.

Zinc-rich coatings are effective in protecting steel against corrosion. The principle of this protective action is attributed to the fact that zinc, being higher than iron in the electromotive series of the elements, reacts first in any environment conducive to the ionic dissolution (oxidation) of metals, thereby protecting the steel substrate.

As the name implies, zinc-rich coatings contain a high concentration of zinc in the dry film. This is required so as to provide the electrical continuity and, therefore, the conductivity necessary for the electrochemical process to take place.

In order to obtain these zinc-rich coatings on a ferrous substrate, a paint formulation containing very fine zinc dust, produced by distilling the metal under controlled conditions of condensation, is used. When the paint is applied, the metallic powder is held in place on the surface by a binder matrix.

The binder compositions described in this invention are ideally suited as the binder matrix in zinc-rich coatings.

The invention is further described in the examples which follow. All parts and percentages are by weight unless otherwise specified.

EXAMPLE 1

To a mechanically stirred reaction flask containing 65 ml of dry cyclohexanone and a thermometer were added 7.80 g of isophorone diisocyanate (IPDI). This mixture was heated to 55° C. and TONE M-100 (12.11 g) was added slowly from an addition funnel over a period of about 30 minutes. The addition funnel was rinsed with a small quantity of dry cyclohexanone, and this was added to the reaction flask. The mixture was reacted at 55° C. for an additional hour with a dry air sparge. A dry solution of 100 g of phenoxy resin (PKHC) in 370 ml of cyclohexanone was added to the intermediate solution at 55° C. This mixture was reacted for a total of four hours, maintaining the dry air sparge throughout the reaction. The yellow solution had a viscosity of 950 cps at 24.0% solids. Films cast from the solution had the following properties:

| Tg | 74° C. |
|---|---|
| Tensile Modulus | 189,000 psi |
| Tensile Strength | 3,760 psi |
| Elongation at break | 75% |

EXAMPLE 2

The procedure of Example 1 was repeated, but the amount of reactants was different. In the first reaction (formulation of the TONE M-100/IPDI intermediate) the following were used: 47.32 g IPDI; 73.68 g TONE M-100; and 380 ml of dry cyclohexanone. In the second reaction, rather than adding the dry phenoxy solution to the intermediate solution, the intermediate solution was added to the dry phenoxy solution (300 g PKHC in 980 ml of cyclohexane). The mixture was then reacted at 55° C. for 16 hours. The yellow solution had a viscosity of 430 cps at 23.7% solids. Films cast from the solution had the following properties:

| Tg | 68° C. |
|---|---|
| Tensile Modulus | 204,000 psi |
| Tensile Strength | 4,260 psi |
| Elongation at break | 147% |

EXAMPLE 3

The procedure of Example 2 was repeated using the following: 46.9 g IPDI; 72.68 g TONE M-100; and 380 ml dry cyclohexanone. The intermediate reaction was run at 55° C. for two hours. This solution was then added to a dry solution of 300 g PKHH in 980 ml of cyclohexanone, and reacted at 55° C. for six hours. The yellow solution had a viscosity of 690 cps at 23.8% solids. Films cast from this solution had the following properties:

| Tg | 71° C. |
|---|---|
| Tensile Modulus | 252,000 psi |
| Tensile Strength | 5,270 psi |
| Elongation at break | 120% |

EXAMPLE 4

The procedure of Example 3 using PKHH was repeated, but the intermediate was prepared from 23.45 g IPDI and 36.34 g TONE M-100 in 190 ml dry cyclohexanone to give a 10% substituted phenoxy. The yellow solution had a viscosity of 1250 cps at 24.3 solids. Films cast from it had the following properties:

| Tg | 80° C. |
|---|---|
| Tensile Modulus | 249,000 psi |
| Tensile Strength | 4,700 psi |
| Elongation at break | 120% |

EXAMPLE 5

The procedure of Example 3 was repeated with 300 g of PKHA as the phenoxy resin. Films cast from the resulting solution had the following properties:

| Tg | 68° C. |
|---|---|
| Tensile Modulus | 159,000 psi |
| Tensile Strength | 2,930 psi |
| Elongation at break | 80% |

EXAMPLE 6

The procedure of Example 3 was repeated with the following exception: the amounts added to the intermediate reaction were 74.25 g IPDI and 115.05 g TONE M-100 in 600 ml of dry cyclohexanone; and the reaction with the PKHH solution was run for 9 hours at 55° C. The resulting solutin had a viscosity of 510 cps at 23.7% solids. Films cast from the solution had the following properties:

| Tg | 66° C. |
|---|---|
| Tensile Modulus | 291,000 psi |
| Tensile Strength | 6,270 psi |

EXAMPLE 7

The procedure of Example 6 was repeated with 300 g of PKHC rather than PKHH. The yellow solution had a viscosity of 300 cps at 23.1% solids.

EXAMPLE 8

The procedure of Example 3 was repeated using a hydroxyl-containing vinyl resin (VAGH). The intermediate consisted of 70.92 g IPDI reacted with 110.18 g TONE M-100 in 716 ml of dry cyclohexanone. The intermediate reaction was run at 55° C. for two hours, and then this solution was added to a solution of 500 g VAGH in 2 L of dry cyclohexanone and reacted at 55° C. for 6 hours. The resulting yellow solution had a viscosity of 790 cps. The film properties of the material were:

| | |
|---|---|
| Tg | 66° C. |
| Tensile Modulus | 341,000 psi |
| Tensile Strength | 8,050 psi |

EXAMPLE 9

The procedure of Example 8 was repeated with the following modifications: the intermediate was made from 28.12 g IPDI and 43.6 g TONE M-100 in 260 ml cyclohexanone, and a vinyl solution of 300 g VAGH in 1120 ml cyclohexanone. The resulting solution had a viscosity of 560 cps. Films cast from this solution had the following properties:

| | |
|---|---|
| Tg | 62° C. |
| Tensile Modulus | 378,000 psi |
| Tensile Strength | 8,070 psi |

EXAMPLE 10

The basic procedure of Example 8 was repeated with 12.38 g IPDI, 19.35 g TONE M-100 and 100 ml of dry cyclohexanone as the ingredients of the intermediate reaction. This intermediate solution was then reacted with 75 g of a carboxyl, hydroxyl-containing vinyl resin (UCARMAG 528, available from Union Carbide) in 237 ml of dry cyclohexanone for 12 hours at 55° C.

The data in Table I demonstrate that modification of phenoxy with IPDI/TONE M-100 results in lower viscosity solutions at a given percent solids. Thus, the solution viscosities of the base resins used to make the materials in Examples 1, 2, 3, 4, 6 and 7 are much higher than those of the modified polymers. It is also evident that the viscosity of the materials decreases with increasing amounts of substitution. The solution viscosities are reported as cps, measured in cyclohexanone at 25° C.

TABLE I
VISCOSITY DATA FOR IPDI/TONE M-100 MODIFIED PHENOXY

| MATERIAL | % SUBS | BASE POLYMER | VISCOSITY | % SOLIDS |
|---|---|---|---|---|
| PKHC | 0 | PKHC | 1710 | 24.4 |
| EXAMPLE 1 | 10 | PKHC | 950 | 24.0 |
| EXAMPLE 2 | 20 | PKHC | 430 | 23.7 |
| EXAMPLE 7 | 30 | PKHC | 300 | 23.1 |
| PKHH | 0 | PKHH | 1900 | 23.6 |
| EXAMPLE 4 | 10 | PKHH | 1250 | 24.3 |
| EXAMPLE 3 | 20 | PKHH | 690 | 23.8 |
| EXAMPLE 6 | 30 | PKHH | 510 | 23.7 |

The data in Table II demonstrate that the flexibility/elongation of phenoxy is improved by the modification. Thus, while the elongation for phenoxy is in the range of 40 to 100%, that for the modified materials was in the 75 to 150% range.

TABLE II
ELONGATION OF MODIFIED PHENOXY RESINS

| MATERIAL | ELONGATION |
|---|---|
| PHENOXY | 40–100% |
| EXAMPLE 1 | 75% |
| EXAMPLE 2 | 150% |
| EXAMPLE 3 | 120% |
| EXAMPLE 4 | 120% |

TABLE II-continued
ELONGATION OF MODIFIED PHENOXY RESINS

| MATERIAL | ELONGATION |
|---|---|
| EXAMPLE 5 | 80% |

EXAMPLE 11

This example illustrates that the IPDI/TONE M-100 modified phenoxies cure thermally to produce solvent-resistant coatings with good flexibility. One-mil coatings of resin made in Example 2 were cast on cold-rolled steel and on glass. These coatings were cured at 180° C. for 30 minutes. The coating on the steel panel underwent >200 MEK double-rubs. A one-mil coating of phenoxy after such a cure would undergo 10 to 20 MEK double-rubs to failure. The coating on the glass plate was removed from the glass by immersion in water. The film was dried in a vacuum oven at 65° C. for 24 hours and had the following properties:

| | |
|---|---|
| Tg | 103° C. |
| Tensile Modulus | 377,000 psi |
| Tensile Strength | 10,100 psi |
| Elongation at break | 45% |

It is clear that the tensile properties improved significantly over those reported in Example 2, and that the Tg increased significantly. These, along with the improved solvent resistance, are evidence that the material cross-linked. Even though cross-linked, the elongation of the film was very good.

EXAMPLE 12

This example illustrates that the modified polymers are cross-linked by UV radiation. Films of material produced in Example 2 containing a photoinitiator (1% IRGACURE 651) were exposed on a web moving at 10 fpm to a 300 watt/inch, medium-pressure, mercury-vapor light source. The films became insoluble in cyclohexanone after exposure, indicating that they had been cross-linked.

The data in Table III demonstrate that the modified phenoxies cross-link when exposed to electron beam (EB) radiation. One-mil films coated on cold-rolled steel were exposed to an electron beam at a dose 5 Mrads (millirads). The data show improved solvent resistance for the modified materials, and that the solvent resistance increases as the level of substitution increases.

TABLE III
SOLVENT RESISTANCE DATA FOR MODIFIED PHENOXY COATINGS AFTER EB CURE

| POLYMER | % SUBSTITUTION | MEK DOUBLE-RUBS |
|---|---|---|
| PKHH | 0 | 15 |
| EXAMPLE 4 | 10 | 75 |
| EXAMPLE 3 | 20 | 90 |
| EXAMPLE 6 | 30 | 130 |

EXAMPLE 13

This example illustrates that magnetic coatings which are EB-curable can be produced from these modified polymers. A magnetic dispersion was made by milling 67 g of polymer solution of Example 6, 160 g of a 15% solution of ESTANE 5701 in cyclohexanone, 6 g of GAFAC RE 610, 200 g of Pferrox 2228, and 138 g of cyclohexanone. This dispersion was coated on Mylar at a thickness of about 0.5 mil (dry) and exposed to EB radiation of doses ranging from 5 to 20 Mrads. These magnetic coatings were compared to similar ones using PKHH rather than the resin solution of Example 6. The coatings were all tested after EB cure for solvent resistance and abrasion resistance. The solvent (MEK) resistance for the PKHH coating after exposure to 5 to 20 Mrads was in the 3 to 4 range, while that for the formulation above was 11 at 5 Mrads and increased to 31 at 20 Mrads. The durability (rubs with an abrasive material to expose the PET substrate) of the PKHH formulation was 12 and that for the formulation above was 400. Thus, it is evident that the modified material provides a magnetic coating that is more solvent resistant and durable than one based on phenoxy.

EXAMPLE 14

This example illustrates that these modified polymers can be used to provide zinc-rich coatings that have better solvent resistance, good flexibility and better corrosion protection. A zinc-rich paint was made by mixing 200 g of zinc dust, 125.5 g of polymer solution of Example 3, 6.2 g MPA 60X, 1.8 g R-972, and 1.0 g CaO in a media mill. This solution was let down with 47 g of cyclohexanone and coated on cold-rolled steel panels. The panels were air dried overnight and then baked at 180° C. for 30 minutes. For comparison purposes, a zinc-rich paint was made using 125 g of a 25% solution of phenoxy (PKHH) instead of the polymer solution of Example 3 in the formulation above. Steel panels were coated with this formulation and treated in an identical fashion as those coated with the modified-phenoxy zinc-rich coating. Both sets of panels were exposed to drawing, MEK double-rub, and salt spray tests. While both sets of panels passed a double-draw cup test, demonstrating good flexibility, the modified-phenoxy zinc-rich coating was more solvent-resistant (>100 MEK double-rubs vs. 11). This indicates that the polymer solution of Example 3 provides a single component, thermal cure, flexible binder. When a phenoxy-based zinc-rich paint is cross-linked either with a polyisocyanate or a melamine to give comparable solvent resistance, it fails the double-draw test. Salt spray testing showed that the polymer of Example 3 provided a zinc-rich paint that had better corrosion resistance and blistered less.

EXAMPLE 15

Into a 4-liter, flamed-out flask equipped with a mechanical stirrer, water-cooled condenser, thermometer and addition funnel were placed 140.4 g (0.795 mole) of toluene diisocyanate (TDI), 1464 g of sieve-dried cyclohexanone, 0.41 g of DABCO (triethylene diamine) and 0.21 g of T-9 (stannous octoate). While agitating the TDI solution, 273.6 g (0.795 mole) of Tone M-100 were added from a drop funnel over 9 minutes with the temperature rising spontaneously from 25° to 36° C. The solution was heated to 60° C. and held under a nitrogen blanket for 1 hour. Analysis by liquid chromatography indicated <0.1% TDI was left.

This intermediate was cooled to 48° C. and rapidly poured into a dry solution of 1440 g of UCARMAG 528 vinyl resin dissolved in 5100 g cyclohexanone. The resulting mixture was maintained at 60° C. under a nitrogen blanket for 3 hours and then allowed to stand 16 hours at 25° C. At this point 0.21 g more T-9 was added and the mixture was heated to 60° C. for 3 more hours and then slowly cooled to room temperature over 1.5 hours. Titration of a 25 g sample using the standard di-N-butyl amine method indicated that the remaining isocyanate was 0.072 Me/g of solution. At this point 21.5 g of methanol were added. Stirring was continued for 30 minutes. The material was then cooled to 25° C. After filtering to remove extraneous solids, resin viscosity was 445 cks at 25° C. and solids content was 22.0%. Gardener color was 6.

A magnetic composite was prepared by milling for one hour the following recipe, with coating properties as shown:

| | |
|---|---|
| Resin | 30 |
| Pferrico 2566 | 170 |
| Cyclohexanone | 330 |
| Viscosity, cps | 3800 |
| Gloss | 80 |
| Squareness Ratio | 0.801 |

EXAMPLE 16

The procedure of Example 15 was used, except that the quantities used were as follows:

| | |
|---|---|
| TDI | 165.4 g |
| Tone M-100 | 327.0 g |
| Cyclohexanone | 1746 g |
| T-9 | 0.25 g |
| DABCO | 0.50 g |

The M-100 was added in 5 minutes and the reaction time for the intermediate was 90 minutes.

The intermediate was added to a solution of 1440 g UCARMAG 520 (a lower molecule weight version of UCARMAG 528) in 5100 g cyclohexanone. The reaction was carried out for 17 hours at 25° C., then for 4 hours at 60° C. At that point, 0.25 g T-9 was added, and the reaction was continued for 2 more hours at 60° C. The residual isocyanate was analyzed to be 0.088 Me/g. Upon adding 27 g methanol, the resin viscosity was 200 cks at 25° C. and the solids content was 21.8%. Gardner color was 4. The product was milled for one hour and coated, with the following results:

| | |
|---|---|
| Resin | 30 |
| Pferrico 2566 | 170 |
| Cyclohexanone | 330 |
| Viscosity, cps | 2200 |
| Gloss | 70 |
| Squareness Ratio | 0.790 |

The recording medium may generally be prepared by dissolving the binder in sufficient volatile vehicle to provide a coatable dispersion of fine, magnetizable particles. The dispersion can then be coated onto the substrate to provide a coating thereon. The magnetic recording medium may be prepared by methods described in the art, such as in, for example, S. Tachihara, "Magnetic Coatings and their Applications in Japan," *Progress in Organic Coatings*, 10 (1982), pages 195 to 204.

| List of Materials Used | |
|---|---|
| GAFAC RE 610 | a surfactant derived from nonyl phenol and 8 moles of ethylene oxide and phosphorous pentoxide, |

| | List of Materials Used |
|---|---|
| | sold by GAF. |
| ESTANE 5701 | an elastomeric polyurethane sold by B. F. Goodrich - prepared by reacting a diisocyanate with a dibasic acid and a polyhydroxy alcohol. |
| Pferrox 2566 | Cobalt-modified gamma-ferric oxide magnetic pigment having a long axis of about 0.4 micron (available from Pfizer Inc.) |
| Phenoxy PKHH | Thermoplastic polymer produced by reaction of bisphenol-A and epichlorohydrin in a caustic solution, having a viscosity of about 4500–7000 cps when measured at room temperaure as a 40% MEK solution. |
| IPDI | isophorone diisocyanate. |
| Phenoxy PKHC | Same as PKHH, but having a viscosity of about 3200–4500 cps. |
| MPA 60 X | Anti-Settling Agent (NL Chemicals). |
| R-972 | Aerosil R-972 (Degussa). |
| MEK | Methylethyl ketone. |
| UCAR ® VAGH | a vinyl chloride/vinyl acetate/vinyl alcohol terpolymer containing nominally 91 weight % vinyl chloride, 3 weight % vinyl acetate and 6 weight % vinyl alcohol, available from Union Carbide Corporation, A 20% solution of terpolymer in MEK has a viscosity at 25° C. of about 60 cps. |
| UCAR ® VAGD | the same as VAGH but whose 20% solution in MEK has a viscosity of about 35 cps. |
| UCARMAG 528 | a vinyl chloride/vinyl acetate/vinyl alcohol/maleic anhydride tetrapolymer available from Union Carbide Corporation. A 20% solution in 50/50 methylisobutyl ketone/toluene has a viscosity at 25° C. of 300–500 cps. |
| UCARMAG 520 | the same as 528, but whose 20% solution has a viscosity of 75–175 cps. |
| IRGACURE 651 | Photoinitiator sold by Ciba-Geigy. |

Although the invention has been described in its preferred forms with a certain degree of particularity, it will be understood by those skilled in the art that the present disclosure has been made only by way of example and that numerous changes can be made without departing from the spirit and scope of the invention.

We claim:

1. A pigment binding composition comprising a normally solid, pendant hydroxyl-containing thermoplastic polymer having at least 8 hydroxyl groups per molecule, whose hydroxyl groups have been partly reacted by a grafting reaction with a condensation product of a diisocyanate and an unsaturated ester, said condensation product having the formula:

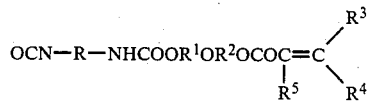

wherein

R is a divalent aromatic, saturated aliphatic or alicyclic group;

$R^1$ is a divalent residue of a saturated aliphatic polyester or polyether, having a number average molecular weight of at least about 100;

$R^2$ is an alkylene group, having 1 to about 10 carbon atoms; and $R^3$, $R^4$ and $R^5$ are each hydrogen or alkyl groups having from 1 to about 15 carbon atoms and can be the same or different.

2. Composition claimed in claim 1 wherein the unsaturated ester is a lactone-acrylate adduct.

3. Composition claimed in claim 2 wherein the lactone-acrylate adduct is prepared by reacting a lactone with a hydroxyalkyl acrylate having 2 to about 4 carbons in the alkyl moiety.

4. Composition claimed in claim 3 wherein the lactone is epsilon-caprolactone and the hydroxyalkyl acrylate is 2-hydroxyethyl acrylate.

5. Composition claimed in claim 1 wherein the diisocyanate is isophorone diisocyanate.

6. Composition claimed in claim 1 wherein the diisocyanate is 2,4-toluene diisocyanate.

7. Composition claimed in claim 1 wherein the diisocyanate is 2,6 -toluene diisocyanate.

8. Composition claimed in claim 1 wherein the diisocyanate is 4,4'-diphenylmethane diisocyanate.

9. Composition claimed in claim 1 wherein the hydroxyl-containing thermoplastic polymer is a thermoplastic polyhydroxyether reaction product of substantially equimolar amounts of a dihydric phenol and epichlorohydrin, said thermoplastic polyhydroxyether having a degree of polymerization of at least about 50.

10. Composition claimed in claim 9 wherein the diisocyanate is isophorone diisocyanate and the unsaturated ester is an adduct of epsilon-caprolactone and 2-hydroxyethyl acrylate.

11. Composition claimed in claim 1 wherein the hydroxyl-containing thermoplastic polymer is an hydrolyzed vinyl chloride/vinyl acetate copolymer.

12. Composition claimed in claim 11 wherein the hydrolyzed vinyl chloride/vinyl acetate copolymer is a vinyl chloride/vinyl acetate/vinyl alcohol terpolymer containing a predominant amount of vinyl chloride copolymerized therein.

13. Composition claimed in claim 1 wherein the hydroxyl-containing thermoplastic polymer is an hydrolyzed alpha-olefin/vinyl acetate copolymer.

14. Composition claimed in claim 13 wherein the hydrolyzed alpha-olefin/vinyl acetate copolymer is an ethylene/vinyl alcohol copolymer.

15. Composition claimed in claim 13 wherein the hydrolyzed alpha-olefin/vinyl acetate copolymer is an ethylene/vinyl acetate/vinyl alcohol terpolymer.

16. A magnetic recording medium composite comprising a base substrate with a stratum of magnetic recording medium deposited and adhering thereon, said magnetic recording medium comprising a cured binder and magnetic particles wherein the binder comprises a normally solid, pendant hydroxyl-containing thermoplastic polymer having at least 8 hydroxyl groups per molecule chain, whose hydroxyl groups have been partly reacted by a grafting reaction with a condensation product of a diisocyanate and an unsaturated ester, said condensation products having the graphic formula:

$$\text{OCN-R-NHCOOR}^1\text{OR}^2\text{OCOC}=C\begin{matrix}R^3\\ \phantom{|}\\R^5\end{matrix}\diagdown R^4$$

wherein

R is a divalent aromatic, saturated aliphatic or alicyclic group;

$R^1$ is a divalent residue of a saturated aliphatic polyester or polyether, having a number average molecular weight of at least 100;

$R^2$ is an alkylene group, having 1 to about 10 carbon atoms; and $R^3$, $R^4$ and $R^5$ are each hydrogen or alkyl groups having from 1 to about 15 carbon atoms and can be the same or different.

17. Composite claimed in claim 16 wherein the hydroxyl-containing thermoplastic polymer is a thermoplastic polyhydroxyether reaction product of substantially equimolar amounts of a dihydric phenol and epichlorohydrin, said thermoplastic polyhydroxyether having a degree of polymerization of at least about 50.

18. Composite claimed in claim 16 wherein the hydroxyl-containing thermoplastic polymer is a vinyl chloride/vinyl acetate/vinyl alcohol terpolymer.

19. Composite claimed in claim 16 wherein the hydroxyl-containing thermoplastic polymer is an ethylene/vinyl alcohol copolymer.

20. Composite claimed in claim 16 wherein the residue $R^1$ is a polyester residue.

21. Composite claimed in claim 16 wherein the hydroxyl-containing thermoplastic polymer is a hydroxyl-containing polyester.

22. Composite claimed in claim 16 wherein the unsaturated ester is a lactone-acrylate adduct.

23. Composite claimed in claim 16 wherein the diisocyanate is isophorone diisocyanate.

24. Composite claimed in claim 16 wherein the diisocyanate is 2,4-toluene diisocyanate.

25. Composite claimed in claim 16 wherein the hydroxyl-containing thermoplastic polymer is an hydrolyzed vinyl chloride/vinyl acetate copolymer.

26. Composite claimed in claim 16 wherein the hydroxyl-containing thermoplastic polymer is an hydroxyalkyl acrylate copolymer.

27. Zinc-rich coating composition containing an organic binder wherein the organic binder comprises a normally solid, pendant hydroxyl-containing thermoplastic polymer, having at least 8 hydroxyl groups per molecule chain, whose hydroxyl group have been partly reacted by a grafting reaction with a condensation product of a diisocyanate and an unsaturated ester, said condensation product having the formula:

$$\text{OCN-R-NHCOOR}^1\text{OR}^2\text{OCOC}=C\begin{matrix}R^3\\ \phantom{|}\\R^5\end{matrix}\diagdown R^4$$

wherein R, $R^1$, $R^2$, $R^3$, $R^4$, and $R^5$ are as defined above.

28. Coating composition claimed in claim 27 wherein the hydroxyl-containing thermoplastic polymer is a thermoplastic polyhydroxyether reaction product of substantially equimolar amounts of a dihydric phenol and epichlorohydrin, said thermoplastic polyhydroxyether having a degree of polymerization of at least about 50, the diisocyanate is isophorone diisocyanate, and the unsaturated ester is an adduct of epsilon-caprolactone and 2-hydroxyethyl acrylate.

29. Coating composition claimed in claim 27 wherein the hydroxyl-containing thermoplastic polymer is a hydrolyzed vinyl chloride/vinyl acetate copolymer, the diisocyanate is isophorone diisocyanate, and the unsaturated ester is an adduct of epsilon-caprolactone and 2-hydroxyethyl acrylate.

30. Coating composition claimed in claim 29 wherein the hydrolyzed vinyl chloride/vinyl acetate copolymer is a vinyl chloride/vinyl acetate/vinyl alcohol terpolymer containing a predominant amount of vinyl chloride copolymerized therein.

31. Composition claimed in claim 1 wherein either or both of the grafting reaction and the condensation reaction have been catalyzed.

32. Composition claimed in claim 31 wherein a catalyst mixture has been used.

33. Composition claimed in claim 32 wherein the catalyst mixture comprises a tin catalyst and an amine catalyst.

34. Composition claimed in claim 33 wherein the hydroxyl-containing thermoplastic polymer also contains carboxyl groups.

35. Composition claimed in claim 11 wherein the hydroxyl-containing polymer also contains carboxyl groups.

36. Composition claimed in claim 16 wherein the hydroxyl-containing polymer also contains carboxyl groups.

37. Composition claimed in claim 12 wherein the hydrolyzed copolymer also contains carboxyl groups.

* * * * *